United States Patent
Power et al.

(10) Patent No.: US 7,063,310 B2
(45) Date of Patent: Jun. 20, 2006

(54) VIBRATION ISOLATOR ASSEMBLY HAVING ALTERED STRESS CHARACTERISTICS AND METHOD OF ALTERING STRESS CHARACTERISTICS OF SAME

(75) Inventors: Douglas Power, Kitchener (CA); Bernie Rice, Thorndale (CA)

(73) Assignee: Cooper-Standard Automotive Inc., OH (US)

( * ) Notice: Subject to any disclaimer, the term of this patent is extended or adjusted under 35 U.S.C. 154(b) by 0 days.

(21) Appl. No.: 10/828,574

(22) Filed: Apr. 21, 2004

(65) Prior Publication Data
US 2004/0251586 A1    Dec. 16, 2004

Related U.S. Application Data

(63) Continuation-in-part of application No. 10/458,514, filed on Jun. 10, 2003.

(51) Int. Cl.
*F16F 5/00* (2006.01)
(52) U.S. Cl. .............. 267/140.12; 267/140.2; 267/141.2; 267/141.5
(58) Field of Classification Search ........... 267/140.11, 267/140.12, 140.13, 140.2, 140.3, 140.4, 267/141, 141.2, 141.4, 141.5
See application file for complete search history.

(56) References Cited

U.S. PATENT DOCUMENTS

| 5,657,510 | A | * | 8/1997 | Satori et al. ............ 16/2.2 |
| 5,725,202 | A | * | 3/1998 | Nakamura et al. ..... 267/140.12 |
| 6,094,818 | A | | 8/2000 | Ogawa et al. |
| 6,145,821 | A | | 11/2000 | Suzuki et al. |
| 6,471,179 | B1 | | 10/2002 | Tousi et al. |
| 6,540,216 | B1 | | 4/2003 | Tousi et al. |
| 6,854,723 | B1 | * | 2/2005 | Ogawa et al. ............ 267/293 |

FOREIGN PATENT DOCUMENTS

| JP | 4321823 | * | 11/1992 |
| JP | 494321823 | A | 11/1992 |
| WO | WO200212748 | * | 2/2002 |

* cited by examiner

*Primary Examiner*—Devon C. Kramer
(74) *Attorney, Agent, or Firm*—Fay, Sharpe, Fagan, Minnich & McKee, LLP (57) ABSTRACT

A vibration isolator assembly, such as an isolator bushing or cradle mount, includes a housing and an isolator connected to the housing. A shaft assembly includes first and second mating components, the first component being connected to the elastomer and having a cavity of a first dimension for receiving the second component having a different, second dimension therein. The differing dimensions alter the stress characteristics of the vibration isolator assembly. In the preferred arrangement, the shaft assembly includes a first component comprising first and second portions, a thin layer of elastomer interposed between the first and second components and a second component which is inserted between the portions to relieve tensile stress in the isolator and, if desired, to impart a compressive stress in the isolator. The thin layer of elastomer permits the first components to be made more economically. The first component of the shaft assembly is made at a lower dimensional tolerance and subsequently produced to a higher dimensional tolerance by molding the thin layer of elastomer to a precision tolerance.

17 Claims, 13 Drawing Sheets

VIBRATION ISOLATOR ASSEMBLY HAVING ALTERED STRESS CHARACTERISTICS AND METHOD OF ALTERING STRESS CHARACTERISTICS OF SAME

This application is a continuation-in-part application of co-pending U.S. Ser. No. 10/458,514, filed 10 Jun. 2003.

BACKGROUND OF THE INVENTION

This invention relates to a vibration isolator assembly that generically refers to a device that absorbs vibrations and dampens relative movement between two structures, such as an isolator mount, bushing assembly, cradle mount assembly, etc.

Figure 11:
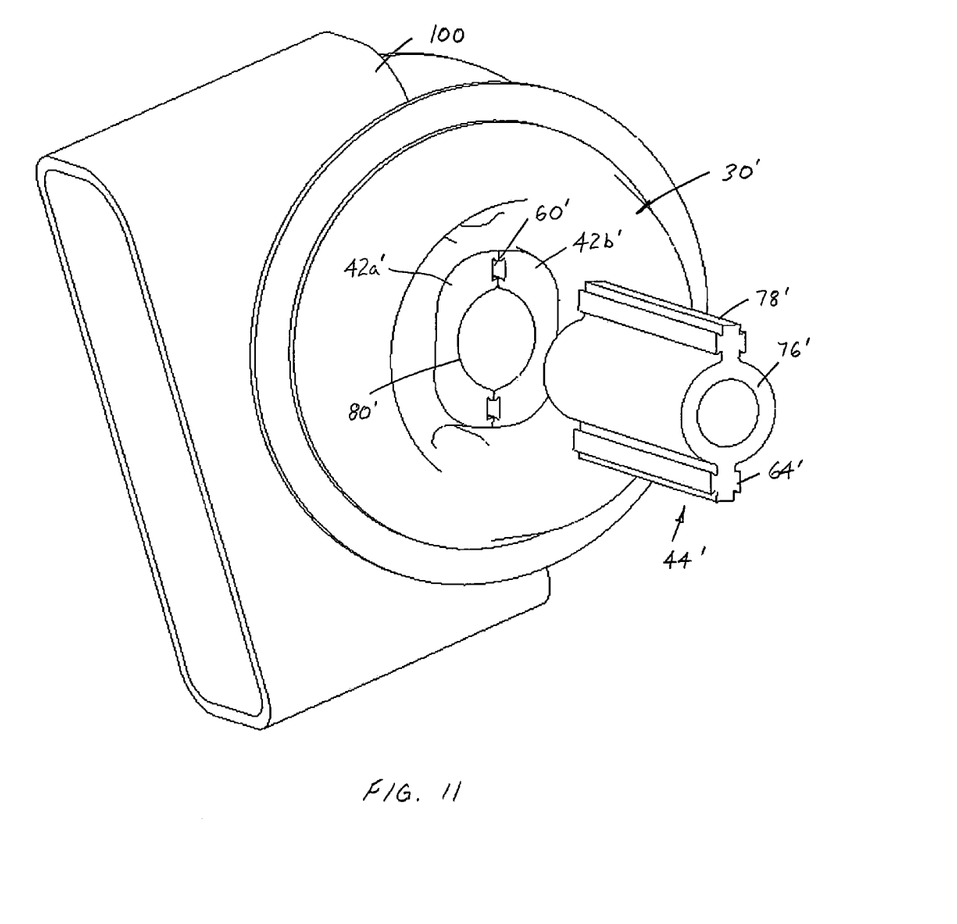
FIG. 11 illustrates a further step in the assembly of the vibration isolator assembly or cradle mount.
Figure 12:
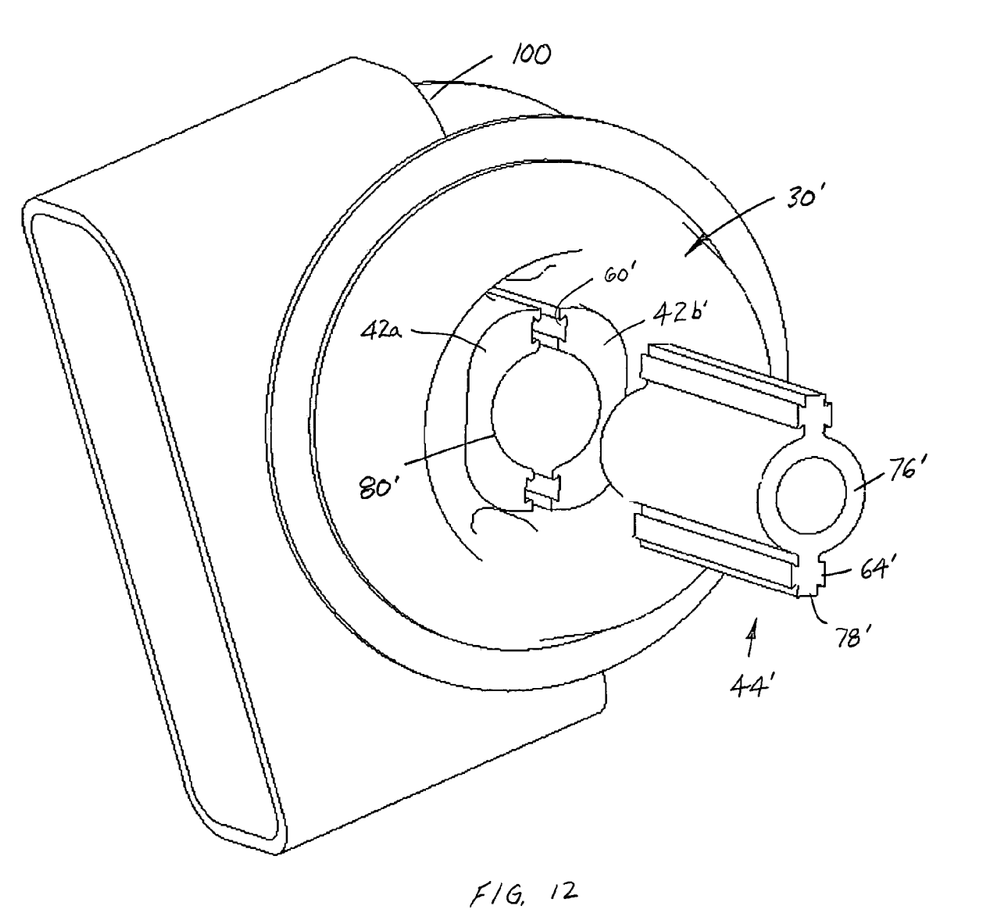
FIG. 12 shows enlarging the cavity of a first component of the shaft assembly.
Figure 13:
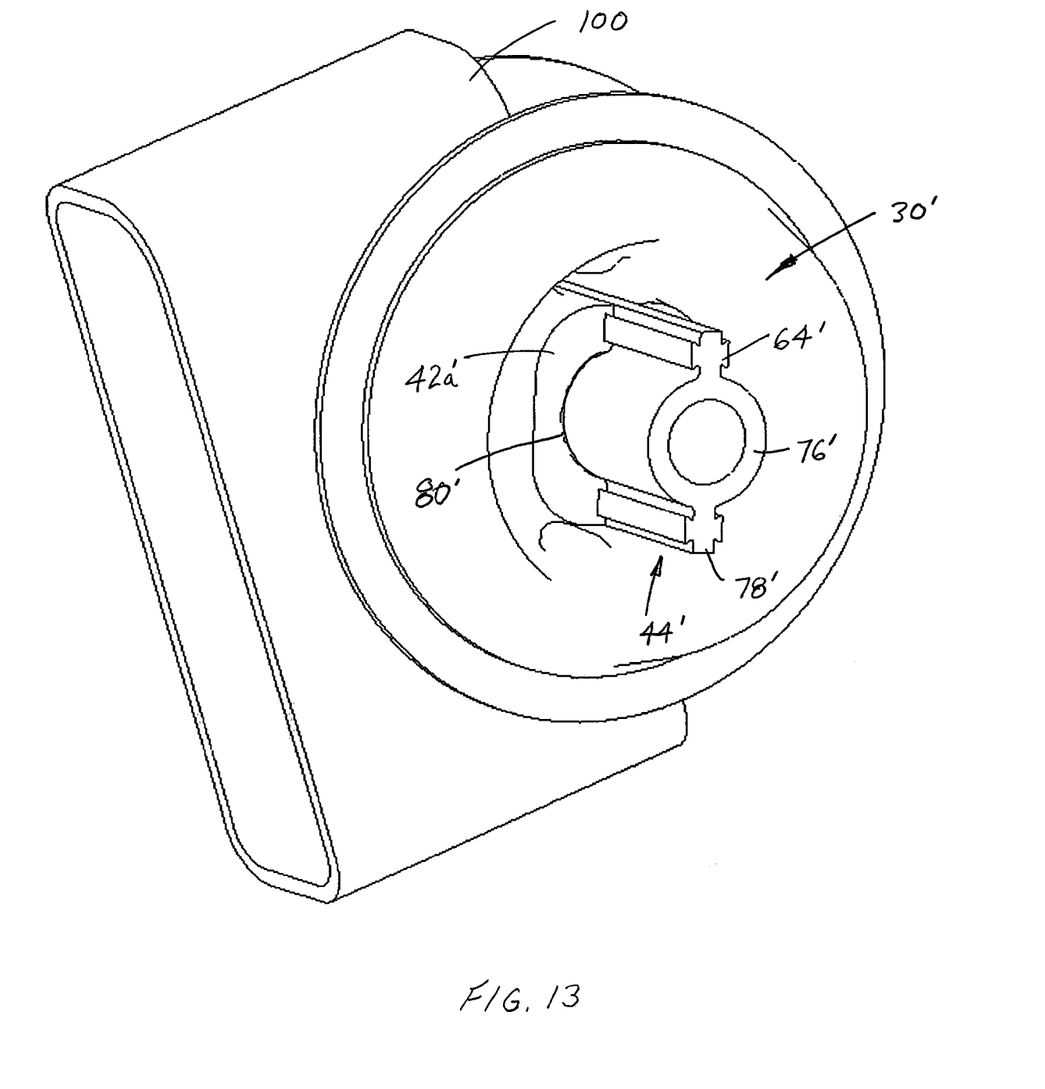
FIG. 13 illustrates partial insertion of the second component of the shaft assembly.
Figure 14:
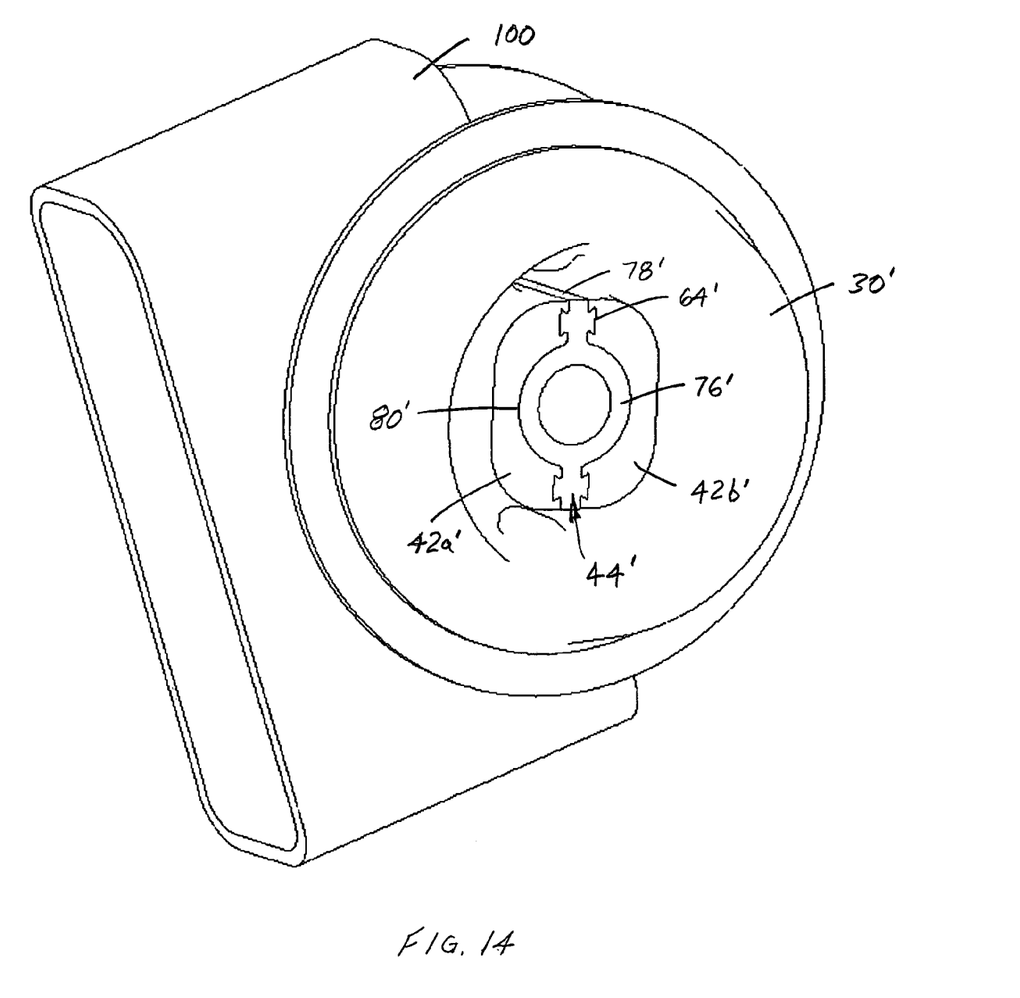
FIG. 14 illustrates the completed assembly of the second embodiment.

A typical vibration isolator includes an external housing and an internal mounting shaft joined by an isolator such as a molded elastomer (e.g., rubber). The elastomer provides isolation between the housing and the mounting shaft. Typically, the elastomer is molded to the housing shaft in a high-temperature molding operation. This provides a desirable bond between the elastomer and the housing, as well as between the elastomer and the mounting shaft. After the molding operation, the elastomer experiences shrinkage as the part cools. Depending on the design, an undesirable effect of this shrinkage is to impart tensile stress to the elastomer. In such cases, fatigue performance of the vibration isolator assembly is generally improved by relieving the stress. One common way of relieving the stress is to pass the external housing through a funnel or reduced diameter opening to permanently reduce the diameter of the assembly. Such an arrangement is shown and described in the prior art representation of FIGS. 11–13 of U.S. Pat. No. 6,094,818, and is also well known to one skilled in the art.

Also, due to general poor fatigue performance of an elastomer under tensile loading, further enhancements to fatigue life may be realized by going beyond the simple relief of imparted tensile stresses and imparting compressive stress to the elastomer. Unfortunately, conventional methods for reducing the outer diameter of the isolator are limited in their effectiveness when there is a desire to impart compressive stress to the elastomer. This is due, for example, to negative effects on the bonding between the isolator and housing materials, i.e., the adhesive layer bonding between the isolator and housing, and isolator and the mounting shaft. There are also limits on the extent of deformation that the housing material can undergo.

It will also be appreciated that a substantial amount of time and money are required to design, redesign, tool, and retool a product. The development cycle requires significant design and engineering time to be sure that the final product meets the final product specifications. If the specifications are altered during the development process, a need exists to remove, modify, and reinstall the assembly in a short time frame. With regard to producing manufactured mounting and vibration isolators for power trains, i.e., engines/transmissions in various consumer and commercial vehicles, as well as a development tool for engineering purposes that allows optimization and tuning of a power train mounting system for improved isolation and performance, a need exists to address tuning and durability issues. If such issues surface late in a program cycle, it is necessary to implement changes without a major redesign or a long retooling time, even though the basic characteristics of the isolator are being modified.

Thus a need exists to enhance the durability and tuning ability of a vibration isolator assembly. Means to relieve residual tensile stress, as well as vary the level of precompression of the elastomer portion, are desired. A need also exists to vary the travel limits of the elastomer portion. Lastly, there is a need to overcome these problems without major reworking of prototype or production tooling.

SUMMARY OF THE INVENTION

The present invention discloses a vibration isolator assembly having a housing and a shaft assembly interconnected by an isolator. The shaft assembly includes first and second mating components, the first component of which is connected to the elastomer. The first shaft component forms a cavity of a first dimension to receive the second component having a second dimension slightly greater than the first dimension for altering stress characteristics of the vibration isolator assembly.

In a preferred embodiment of the invention, the isolator is an elastomer, and the housing may be either metal or non-metal.

The second mention of the second component of the shaft assembly is pre-selected to relieve molded in tensile stress, or impart compressive stress to the isolator.

In one embodiment, the first component of the shaft assembly is a split member and the second component is received along the split plane.

The first and second components of the shaft assembly have a keyed contour relationship to selectively alter spring rate build-up characteristics In one embodiment, the first component of the shaft assembly is comprised of first and second mirror portions and the second component is received between the portions.

A thin layer of elastomer is interposed between the first and second components of the shaft assembly.

The first and second components of the shaft assembly have an "I" contour relationship to selectively alter spring rate build-up characteristics.

A primary benefit of the invention resides in the ability to relieve molded in tensile stress and, if desired, impart compressive stress without affecting the housing or bonded layer between the housing and the elastomer material.

Another benefit of the invention resides in the ability to manipulate spring rate magnitude, rate ratios, rate build-up, and component fatigue characteristics of the vibration isolator assembly.

Still another benefit resides in reduced tooling costs and reduced lead times associated with different designs so that more options can be made available within the constraints of a fixed or predetermined development budget.

Still another benefit resides in the ability to manufacture the first components more economically at a lower tolerance of form by employing the layer of elastomer which is produced at precision tolerance through mold design to account for variation and permit easy assembly of the shaft assembly.

Yet another benefit is the ability to make changes to a design and tuning specifications without impacting a launch schedule of the product.

Still other benefits and advantages of the invention will become apparent to those skilled in the art upon reading and understanding the following detailed description.

BRIEF DESCRIPTION OF THE DRAWINGS

A more complete appreciation of the present invention and many of its advantages may be obtained by referring to the following detailed description in conjunction with the accompanying drawings.

DETAILED DESCRIPTION OF THE INVENTION

Figures 1, 2, 3:
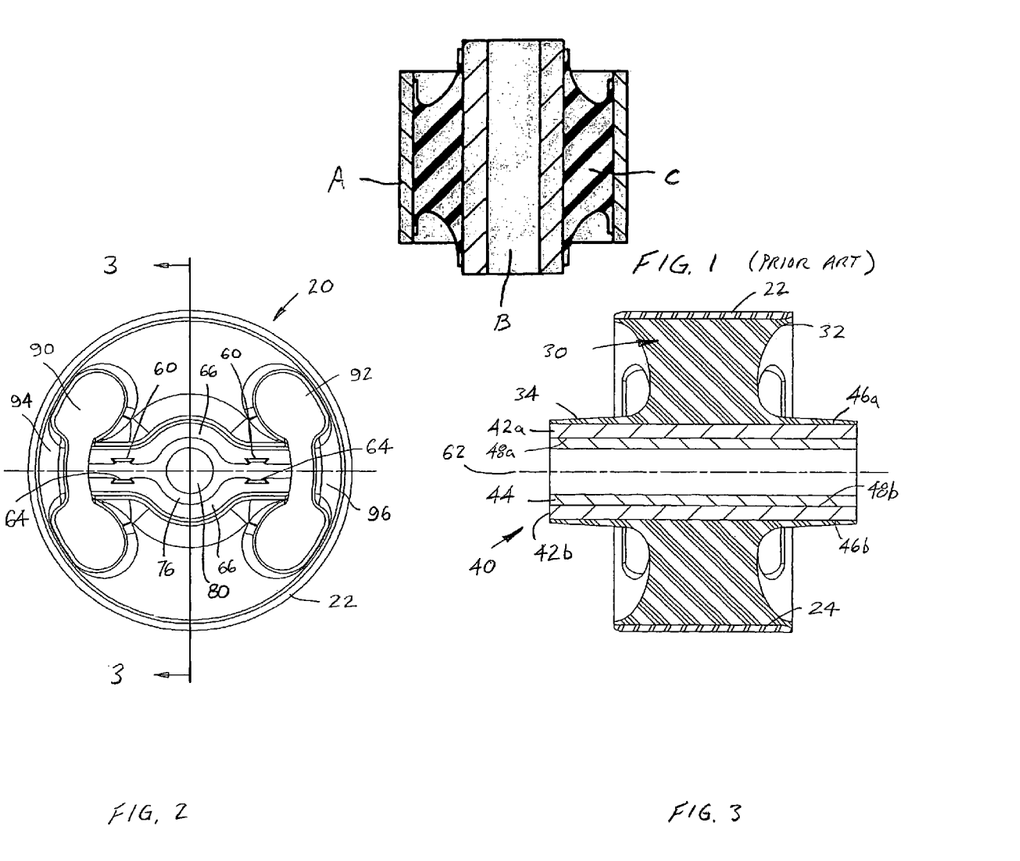
FIG. 1 is a cross-sectional view illustrating a conventional vibration isolator assembly or suspension bushing.
FIG. 2 is an elevational view of an embodiment of the present invention.
FIG. 3 is a cross-sectional view taken generally along the lines 3—3 of FIG. 2.

By way of brief description, a conventional vibration isolator assembly A is shown in FIG. 1. The assembly includes a housing A and a shaft B that are interconnected by an isolator such as elastomer C. As noted above, the elastomer is typically mold bonded to the shaft and the housing and provides the vibration damping between the shaft secured to a first structure or component that moves relative to the housing which is secured to a second structure or component.

A first embodiment of the present invention is shown in FIGS. 2–7. Vibration isolator assembly 20 includes a housing 22. Typically, the housing is a metal structure, although as will be appreciated in accordance with the present invention, alternative materials including non-metallic materials such as nylon can be used to form the housing. As illustrated in FIGS. 2 and 3, when used as a mount bushing, the housing typically adopts a generally cylindrical conformation, i.e., circular in cross section. Secured to an inner surface 24 of the housing is an isolator 30. The isolator is often an elastomer or rubber construction because of the ability to isolate and reduce noise and vibration from being transmitted therethrough because of the elastic nature of the material. Rubber is generally an incompressible material that is displaced during loading and exhibits the desirable property that the more the rubber is compressed, the higher the stiffness. This rate build-up controls noise, vibration, and harshness associated with, for example, the vehicle environment. The elastomer is preferably mold bonded to the inner surface 24, although it will be appreciated that other bonding arrangements such as an adhesive bond, can be used without departing from the scope and intent of the present invention. Likewise, an inner diameter portion 34 of the isolator is secured to a shaft assembly 40, which is preferably comprised of first and second components 42, 44. The isolator is secured to a first or outer surface 46 of the first component and again is illustrated as being mold bonded thereto. As will become more apparent below, the first component 42 in this embodiment is defined by first and second portions 42a, 42b that are separated and have outer surfaces 46a, 46b that are bonded to the isolator, respectively. Inner, facing surfaces 48a, 48b of the first component are separated along a split plane and slidably engage the second component 44 of the shaft assembly. As perhaps best illustrated in FIG. 2, and FIGS. 4–7, the first and second components 42, 44 of the shaft assembly have mating, keyed configurations that provide for slidable insertion of the second component into a cavity defined along the split plane between the first and second portions 42a, 42b of the first component, and likewise resist relative movement between the first and second components in other directions. This mating, keyed configuration provides an interlocking feature that allows the separate components (here, three separate pieces) to merge and function as a single component. For example, as illustrated in FIG. 2, the first and second portions 42a, 42b of the first component have dove-tailed keyways 60 formed on opposite axial sides of central axis 62. The keyways are dimensioned to receive mating, dove-tailed keys or projections 64 that extend outwardly from the second component 44 of the shaft assembly. Thus, with continued reference to FIG. 2, and additional reference to FIGS. 4 and 5, it is seen that the first component 42 includes first and second mirror-image portions 42a, 42b having a central rounded portion 66 that merges into generally planar, outer radial portions 68. The first and second portions 42a, 42b are separable or split along the plane 70 that passes through the longitudinal axis 62. The second component is similarly contoured, having a central rounded portion 76 that merges into generally planar, outer radial portions 78 disposed on diametrically opposite sides of the rounded portion. As will be appreciated, although this contour has met with success, still other variations or contours may be used without departing from the scope and intent of the present invention.

Figure 4:
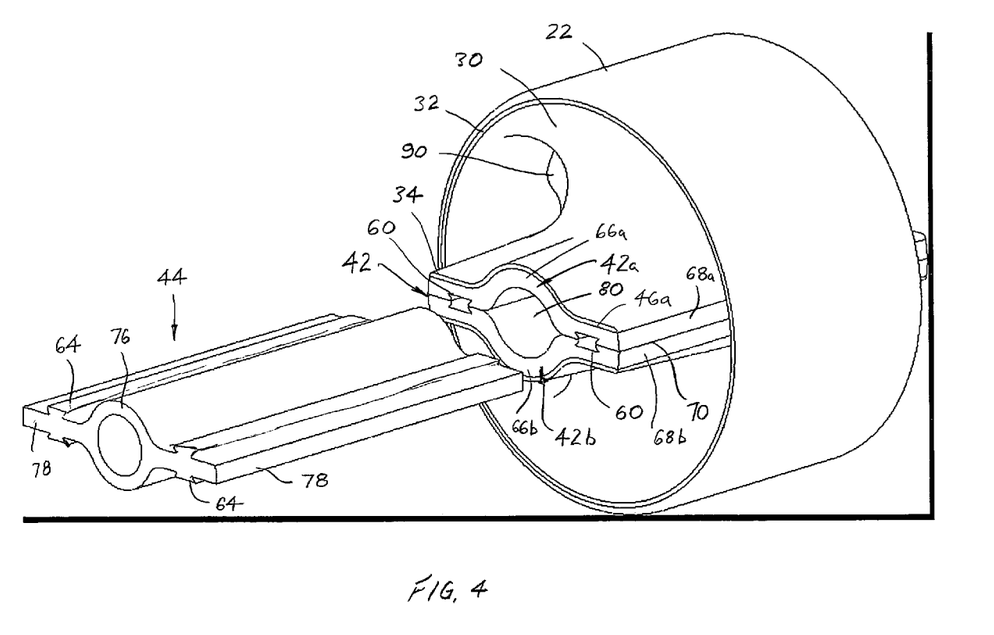
FIG. 4 is a perspective view of a second component of the shaft assembly separated from the remainder of the vibration isolator assembly.
Figure 5:
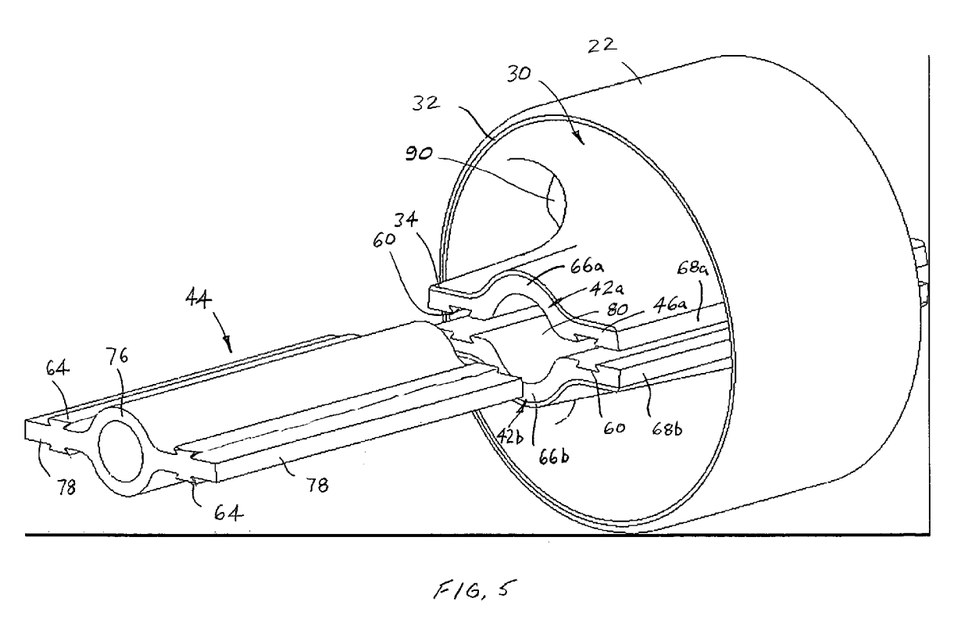
FIG. 5 illustrates a separation of a first component of the shaft assembly along a split plane for receipt of the second component.

As represented in FIG. 4, the mirror image portions 42a, 42b of the first component of the shaft assembly are integrally bonded to the isolator. The portions are separable along the facing, mating surfaces along split plane 70. Thus, as shown in FIG. 4, the facing dovetailed keyways 60 define an outer radial cavity portion and the rounded portions 66a, 66b define a central cavity portion 80. When the portions 42a, 42b are disposed in abutting relation as shown in FIG.

Figure 6:
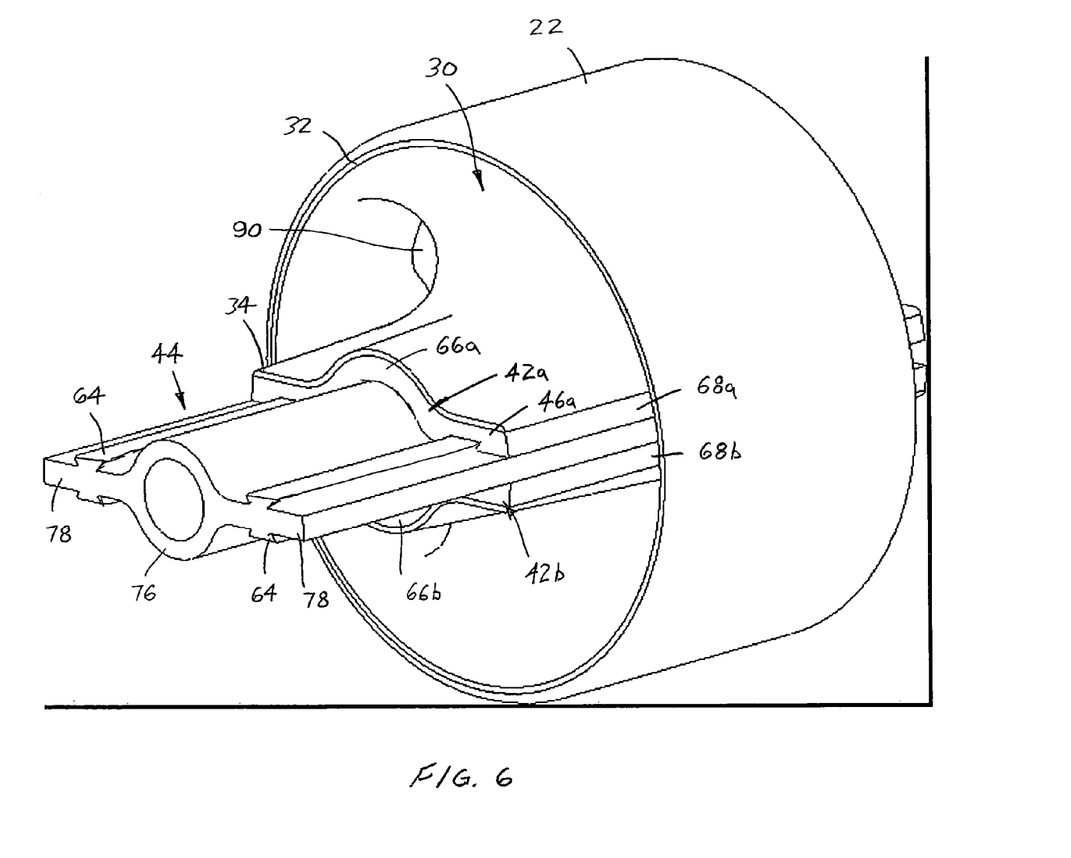
FIG. 6 illustrates partial insertion of the second component into the remainder of the vibration isolator assembly.
Figure 7:
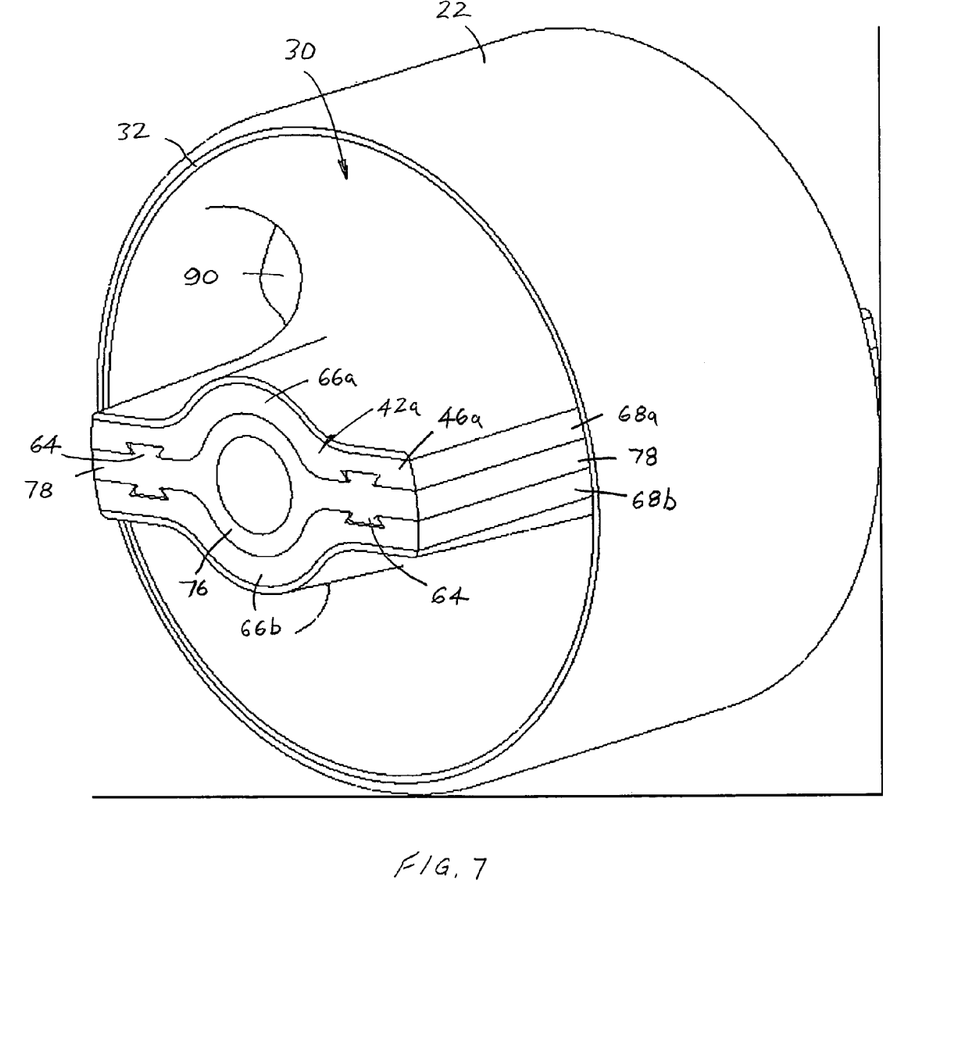
FIG. 7 is a perspective view of the final assembly.
Figure 8:
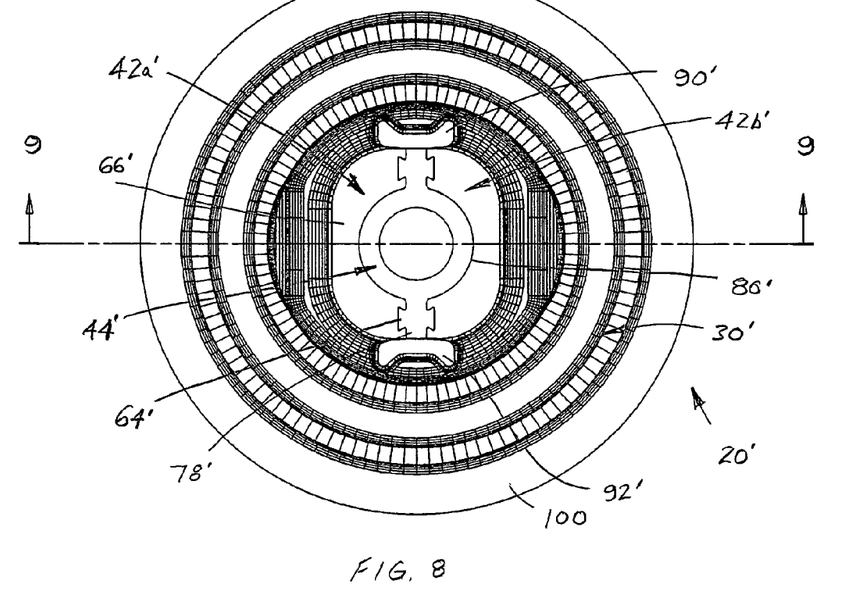
FIG. 8 is an elevational view of another embodiment of the present invention, namely, a cradle mount assembly.
Figure 9:
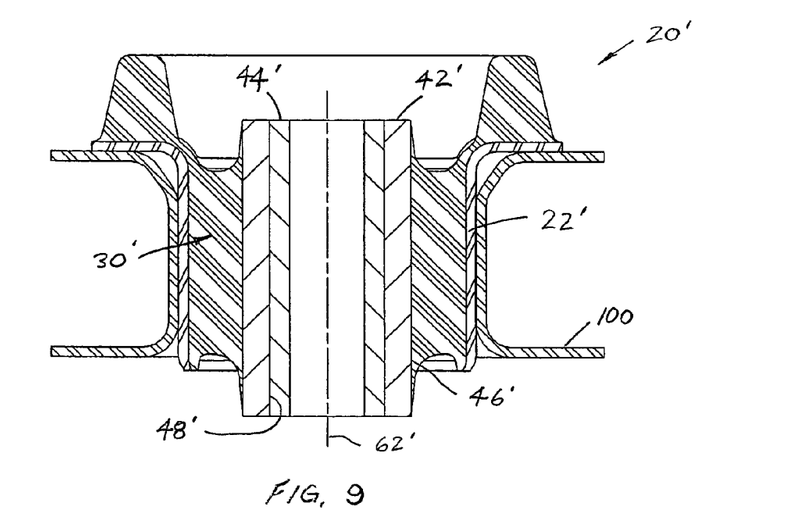
FIG. 9 is a cross-sectional view taken generally along the lines 9—9 of FIG. 8.
Figure 10:
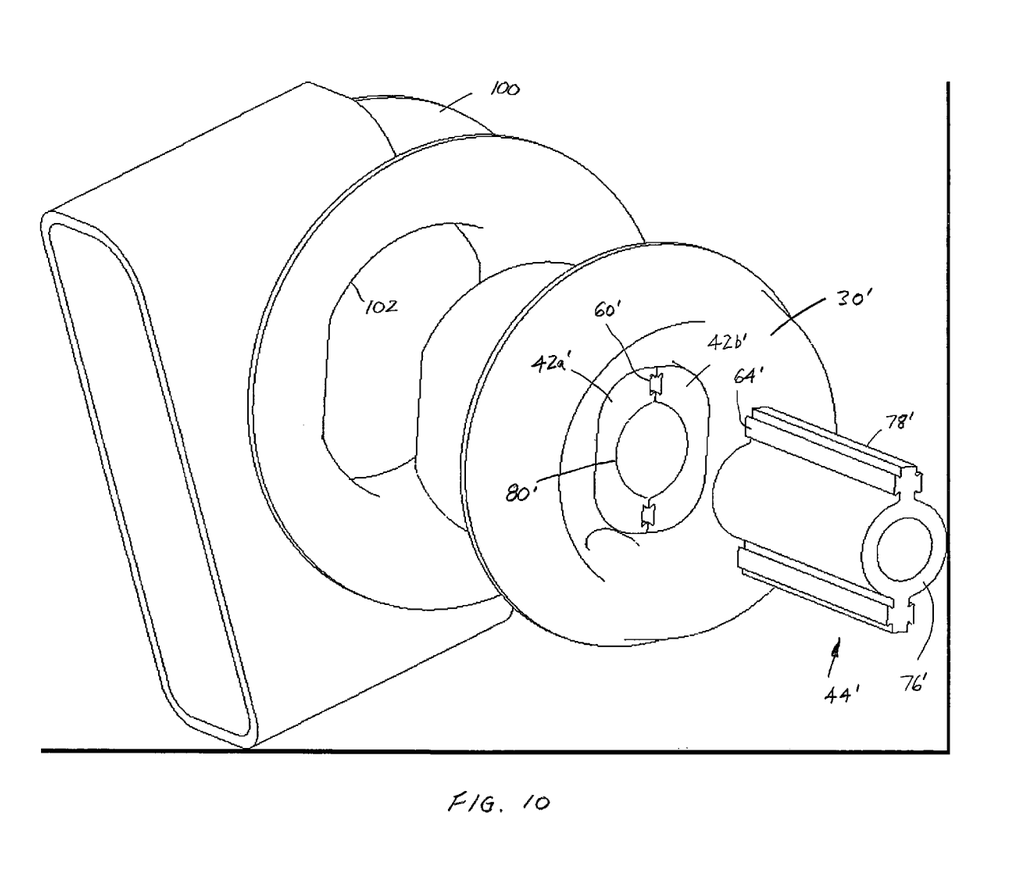
FIG. 10 is an exploded perspective view of individual components of the assembly.

4, the cavities 80 defined by the keyways present a first dimension of the first component of the shaft assembly that is smaller than a second dimension provided by the preselected, mating contour of the second component. Thus, and as will be appreciated from a comparison of FIGS. 4 and 5, the first and second portions 42a, 42b of the first component of the shaft assembly are spread apart or separated along the split plane 70 to enlarge the cavity or opening 80 and allow selective sliding receipt of the second component 44 of the shaft assembly therein. This sliding receipt is represented in FIG. 6, where the second component is partially received into the first component of the shaft assembly. Ultimately, complete insertion of the second component into the first component is achieved and is represented in FIG. 7.

As noted in the Background discussion above, the isolator is typically an elastomer molded between the housing and shaft, here between the housing and the first component 42 of the shaft assembly. When it cures, the elastomer ends up with residual tensile stress. As noted, the prior art has addressed this in a different manner. Here, using a two-part shaft assembly alters the stress characteristics of the vibration isolator assembly. At a predetermined dimension of the second component 44, the residual tensile stress in the elastomer is removed upon complete insertion of the second component into the first component. If the second component is made even larger, then a predetermined compressive stress is formed in the isolator/elastomer. All of this is achieved without affecting or adversely impacting on the bond between the housing and elastomer, and likewise between the elastomer and shaft assembly.

By varying the thickness of the second component, variable compressive stresses can be introduced into the elastomer. This has two basic effects. The first effect is associated with spring rate. The compressive rate characteristics of the main elastomer elements will increase in magnitude, roughly in proportion to the degree of precompression, while the shear rate characteristics of the same elastomer elements will remain relatively unaffected. This results in a change in the compressive-to-shear rate ratio of the final assembly.

The second effect deals with fatigue life. In general, an elastomer or rubber can tolerate increasing levels of compressive stress under cyclic loading much better than it tolerates smaller amounts of tensile stress. Thus, by introducing compressive stress via this method, fatigue life of the assembly can be enhanced. The forced separation of the molded split shaft assembly relieves the tensile stress resulting from part shrinkage, and imparts or introduces a desired compressive stress to the molded rubber, if desired.

It is also known in these isolation mount assemblies or bushing assemblies to incorporate one or more openings in the elastomer. Thus, as shown in FIGS. 2–7, the elastomer is radially continuous between the housing and the shaft assembly in one diametrical dimension (e.g., in the vertical direction as shown) and is discontinuous in another diametrical direction (e.g., in the horizontal direction as shown) through the inclusion of openings 90, 92. Here, the openings 90, 92 are generally symmetrical in the vertical and horizontal directions, but need not necessarily be symmetrical or similarly shaped. Likewise, boundary rubber 94, 96 (FIG. 2) define snubbing rubber extending inwardly from the housing in the horizontal direction. By selectively altering the width dimension of the second component of the shaft assembly, i.e., by extending the planar portions 78 radially outward, the gap between the shaft assembly and the boundary rubber is selectively altered. As the shaft assembly width is increased, the amount of travel that the shaft assembly proceeds through before contacting the boundary rubber on the housing will decrease. This transfers loading and stress more rapidly from the main central rubber elements to the exterior boundary or snubbing elements, and effectively alters the spring rate build-up characteristics. This has the effect of providing additional tuning options and improved fatigue durability.

The present invention is also useful in other vibration isolator assemblies such as the cradle mount shown in FIGS. 8–14. Since much of the structure and function is substantially identical, reference numerals with a primed suffix refer to like components (e.g., housing is referred to by reference numeral 22'), and new numerals identify new components. The primary distinction relates to the frame 100 of the vehicle in which the housing 22' of the cradle mount assembly 20' is also molded to the first component portions 42a', 42b' of the shaft assembly. The subassembly, i.e., housing 22', is initially inserted into the frame 100, namely opening 102. Rather than encountering high insertion forces as is typical with conventional structures, smaller friction forces can be provided during insertion of the housing into the frame in accordance with the present invention. Thereafter, the first component portions of the shaft assembly are spread apart (FIG. 12) to accommodate the second component 44'. The second component is slidably received therein (FIG. 13), thus altering the stress characteristics of the isolator/elastomer, and also enhancing the abutting engagement force between the housing 22' and the frame 100.

The housing 22' is preferably metal, but is should be noted that other composite or hard materials may be used. Likewise, the outer dimension of the housing can relate to any shape such as rectangular, square, circular, triangular, or any other shape or surface depending on the size and requirements needed for the end use. Similarly, the shaft assembly is shown as being located at or near the center point of the housing, although that could be varied. Likewise, although it is preferred to extrude the shaft assembly components from aluminum, occasionally other materials, e.g., cast, extruded, powdered metal, forgings, cold headed steel, or still other materials of construction may be used without departing from the scope and intent of the invention. The number and/or shape of the openings can also be varied, and the elastomer isolator that is bonded to the housing components may be secured thereto with any other type of bonding.

Similar to the aforementioned embodiments, two additional embodiments are shown in FIGS. 15–20. Since most of the structure and function is substantially identical, reference numerals with a double primed suffix (") refer to like components (e.g., housing is referred to by reference numeral 22"), and new numerals identify new components in the additional embodiment of FIGS. 15–17. Likewise, reference numerals with a triple primed ('") suffix refer to like components (e.g., housing is identified by reference numeral 22'") in the still additional embodiment of FIGS. 18–20, and new numerals identify new components. The primary distinctions relate to the first component and second component of the shaft assembly.

Figure 15:
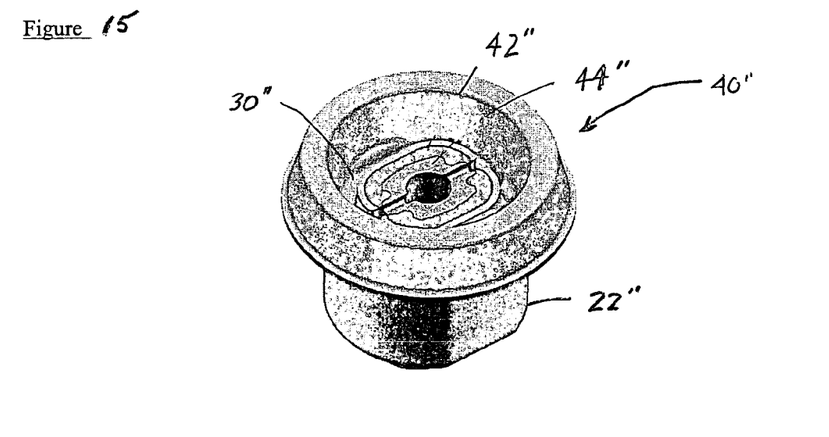
FIG. 15 is a perspective view of the completed assembly of individual components of a third embodiment.
Figure 16:
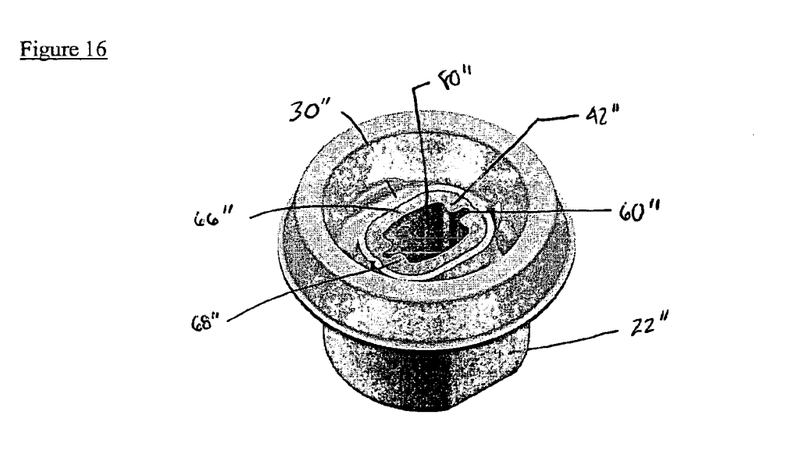
FIG. 16 is a perspective view of another embodiment of the housing, isolator and first component of a shaft assembly.
Figure 17:
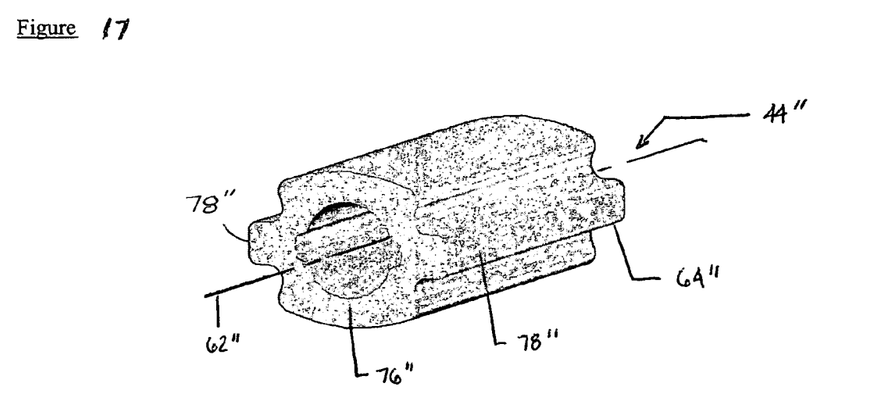
FIG. 17 is a perspective view of a second component of the shaft assembly of the third embodiment.

As shown in FIGS. 15–17, the first and second components 42", 44" of the shaft assembly have mating, keyed configurations that provide for slidable insertion of the second component into a cavity defined by the first component. This mating, keyed configuration provides an interlocking feature that allows the separate components to merge and function as a single component. Preferably, the first component has enlarged dove-tailed keyways 60" formed on opposite axial sides of the central longitudinal axis 62". The keyways are dimensioned to receive mating, dove-tailed keys or projections 64" that extend outwardly from the second component 44" of the shaft assembly. Thus, with continued reference to FIGS. 15–17, it is seen that the first component 42" has a central, rounded (although no circular) portion 66" that merges into generally planar, outer portions 68". The second component is similarly contoured, having a central portion 76" that merges into generally planar, outer portions 78" disposed on diametrically opposite sides of the central portion.

The facing dovetailed key ways 60" define an outer cavity portion and the non-rounded portions 66" define a central cavity portion 80". The cavities present a first dimension of the first component of the shaft assembly that is smaller than a second dimension provided by the preselected, mating contour of the second component and allow selective sliding receipt of the second component 44" of the shaft assembly therein. Accordingly, as it relates to the first embodiment and specifically when compared with the enlarged dove-tailed projections 64" and keyways 60", this configuration reduces tolerance requirements for the dove-tail locking feature and simplifies assembly of the shaft assembly into the cavity portion.

Figure 18:
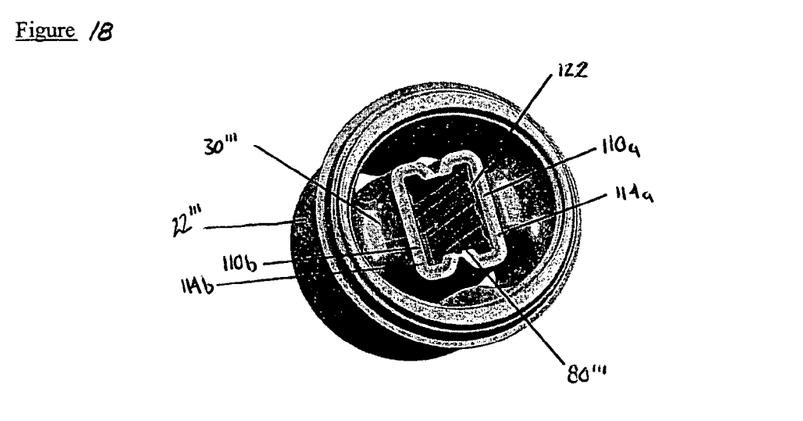
FIG. 18 is a perspective view of a fourth embodiment of the housing, isolator and a first component of the shaft assembly.
Figure 19:
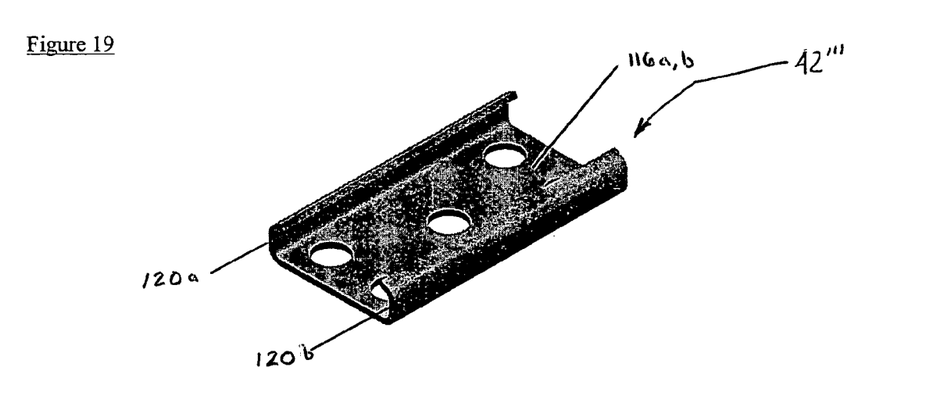
FIG. 19 is a perspective view of the first component of the shaft assembly.
Figure 20:
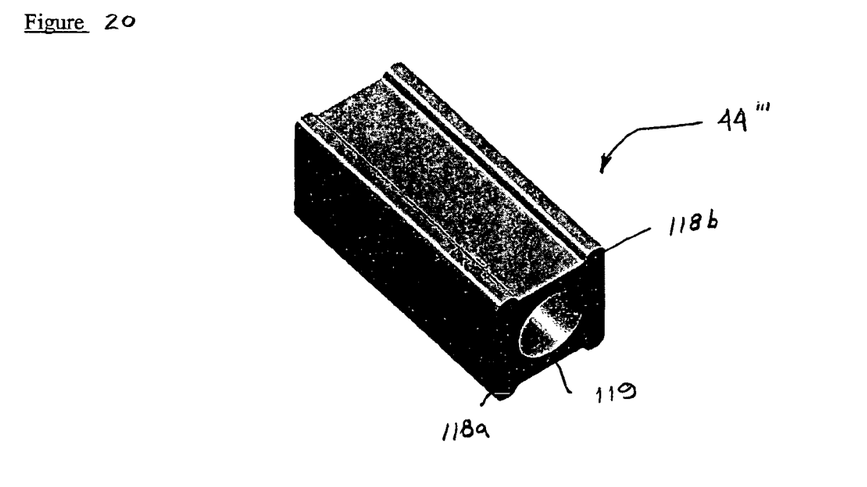
FIG. 20 is a perspective view of the second component of the shaft assembly.

As shown in FIGS. 18–20 and as will become more apparent below, the first component 42''' in this embodiment is defined by first and second mirror portions 110a, 110b that are separated and have outer surfaces 114a, 114b that are bonded to the isolator 30''', respectively. Inner facing surfaces 116a, 116b of the first component are separated by the isolator and slidably engage the second component 44''' of the shaft assembly. The first and second components 42''', 44''' have mating configurations that provide for slidable insertion of the second component into a cavity 80''' defined between the first and second portions 110a, 10b of the first component and the isolator 30''', and likewise resist relative movement between the first and second components in other directions. This mating configuration provides an interlocking feature that allows the separate components to merge and function as a single component.

With reference to FIG. 20, it is seen that the second component 44''' of the shaft assembly (sometimes referred to as the spreader component) has a general "I" or I-beam contour with keyed portions 118a, 118b extending from a central portion 119. The first and second portions 110a, 110b of the first component have curved end portions 120a, 120b (FIG. 19) dimensioned to receive the "I" contour of the second component. The inner facing surfaces 116a, 116b of the first and second portions 110a, 110b of the first component 42''' have a thin layer or skin 122 of elastomer bonded thereto (FIG. 18). The elastomer 122 bonded to the inner facing surfaces 116a, 116b of the first component permits the first component (sometimes referred to as a capture plate of half-shaft) to be manufactured more economically at a lower tolerance of form. The elastomer layer is produced at precision tolerances through mold design thereby taking up any variation in the dimensions of the first component and allowing consistent assembly of the first component and second component. As will be appreciated in accordance with the present embodiment, alternate materials can be used to form the elastomer layer or skin.

As represented in FIG. 20, the first and second portions 110a, 110b of the first component of the shaft assembly are integrally bonded to and separated by the isolator and define a central cavity portion 80'''. This cavity defines the first dimension of the first component of the shaft assembly that is smaller than a second dimension provided by the preselected, mating "I" contour of the second component. Thus, the first and second portions 110a, 110b of the first component 42''' allow sliding receipt of the second component 44''' of the shaft assembly therein.

Again, it will be appreciated that the third and fourth embodiments of FIGS. 15–20 use first and second components that are preferably extruded designs because of the ease of manufacture and assembly. The ability to use other shapes, designs, or contours that are not extruded or conducive to extruding should be recognized as being within the scope and intent of the present invention.

In summary, the manipulation of spring rate magnitude, rate ratios, rate build-up, and component fatigue characteristics is accomplished using a common molded isolator or elastomer and interchangeable shaft assemblies of different designs. This is important since higher tooling costs and longer lead times are typically associated with the isolator/elastomer, while the inserted shaft can be modified quickly and economically. The economical aspect of the vibration isolator assembly means that more options can also be made available within the constraints of a development budget. This highlights yet another feature of the invention wherein the ability to make changes to design and tuning specifications later in the program can be achieved without impacting the launch schedule of the product.

The invention has been described with reference to the different embodiments. Modifications and alterations will occur to others upon reading and understanding this specification. For example, various other manufacturing steps may be employed or in a different sequence. Likewise, different materials may be used or alternative processes without departing from the present invention. It is intended to include all such modifications and alterations in so far as they come within the scope of the appended claims or the equivalents thereof.

Having thus described the invention, it is now claimed:

1. A vibration isolator assembly comprising:
   a housing;
   an isolator connected to the housing for limiting the transmission of vibrations thereto;
   shaft assembly including first and second mating components, the first component connected to the isolator and forming a cavity of a first dimension for receiving the second component having a second dimension slightly greater than the first dimension for altering stress characteristics of the isolator assembly, wherein the second component has an "I" contour which limits relative movement of the first and second components of the shaft assembly; and
   a thin layer of material interposed between the first and second components of the shaft assembly.

2. The invention of claim 1 wherein the thin layer of material is an elastomer provided on one of the first and second components of the shaft assembly.

3. The invention of claim 2 wherein the thin layer of elastomer is provided on the first component of the shaft assembly.

4. The invention in claim 3 wherein the thin layer of elastomer is provided on an inner surface of the first component.

5. The invention of claim 4 wherein the second component is contoured for receipt in the cavity of the first component along the surfaces of first and second portions of the first component.

6. The invention of claim 1 wherein the thin layer of material is provided on the first component of the shaft assembly.

7. The invention of claim 1 wherein the isolator is an elastomer.

8. The invention of claim 1 wherein the housing is metal.

9. The invention of claim 1 wherein the housing is a non-metallic material.

10. The invention of claim 1 wherein the isolator is an elastomer that is molded to the housing and the first component of the shaft assembly.

11. The invention of claim 1 wherein the first component is contoured for slidable receipt of the second component.

12. The invention of claim 1 wherein the second dimension of the second component is preselected to relieve tensile stress in the isolator.

13. The invention of claim 1 wherein the second dimension of the second component is preselected to impart compressive stress to the isolator.

14. A vibration isolator assembly comprising:
   a housing;
   an elastomer isolator connected to the housing for limiting the transmission of vibrations thereto; and
   a shaft assembly that is adapted for exposure to vibration forces, the shaft assembly including first and second mating components, the first component connected to the isolator and forming a cavity of a first dimension for receiving the second component having a second dimension slightly greater than the first dimension for altering stress characteristics of the isolator assembly, the cavity including a thin layer of elastomer interposed between the first and second components of the shaft assembly, wherein the first and second components of the shaft assembly include keyed contours for limiting relative movement of the first and second components of the shaft assembly in directions other than a direction of the split between the first and second components.

15. The invention of claim 14 wherein the first component is contoured for slidable receipt of the second component of the shaft assembly.

16. The invention of claim 15 wherein the first component of the shaft assembly is a split member having first and second surfaces disposed in facing relation.

17. The invention of claim 16 wherein the second component is contoured for receipt in the cavity of the first component along the split, first and second surfaces of the first component.

* * * * *